United States Patent [19]

Tingley

[11] Patent Number: 5,498,460
[45] Date of Patent: Mar. 12, 1996

[54] SURFACE TREATED SYNTHETIC REINFORCEMENT FOR STRUCTURAL WOOD MEMBERS

[76] Inventor: Daniel A. Tingley, 3310 SW. Willamette Ave., Corvallis, Oreg. 97333

[21] Appl. No.: 307,315

[22] Filed: Sep. 16, 1994

Related U.S. Application Data

[63] Continuation-in-part of Ser. No. 37,580, Mar. 24, 1993, Pat. No. 5,362,545.
[51] Int. Cl.$^6$ .................. B32B 3/06; B32B 3/30; B32B 5/08; E04C 3/12; E04C 3/29
[52] U.S. Cl. .................. 428/96; 52/223.1; 52/309.16; 52/730.1; 52/DIG. 7; 156/154; 156/155; 264/46.1; 264/46.4; 264/139; 264/172.15; 264/229; 264/231; 264/232; 264/233; 427/352; 427/353; 428/114; 428/137; 428/141; 428/172; 428/294; 428/902
[58] Field of Search .................. 428/137, 141, 428/172, 96, 114, 294, 902; 427/352, 353; 52/223.1, 309.16, 727, 730.1, DIG. 7; 156/154, 155; 264/46.1, 46.4, 139, 172, 229, 231, 232, 233

[56] References Cited

U.S. PATENT DOCUMENTS

| | | | |
|---|---|---|---|
| 5,061,545 | 10/1991 | Li et al. | 428/172 |
| 5,332,626 | 7/1994 | Conston et al. | 428/141 |
| 5,362,545 | 11/1994 | Tingley | 428/96 |

*Primary Examiner*—James C. Cannon
*Attorney, Agent, or Firm*—Stoel Rives

[57] ABSTRACT

A synthetic reinforcement having a plurality of recesses on a surface to facilitate adhesion to wood structural members and a process for making the same is disclosed. The synthetic reinforcement is comprised of a plurality of continuous fibers that are maintained in position by a resin encasement. The surface of the synthetic reinforcement is characterized by recesses that are located in a generally random pattern, which increases the surface area of the resin encasement. The synthetic reinforcement is connectable to wood laminae or itself with commercial grade adhesives such as the resorcinol resins, which are suitable for adhering the wood laminae together.

20 Claims, 6 Drawing Sheets

SURFACE TREATED SYNTHETIC REINFORCEMENT FOR STRUCTURAL WOOD MEMBERS

RELATED APPLICATION

This application is a continuation-in-part of U.S. patent application Ser. No. 08/037,580, filed Mar. 24, 1993, now U.S. Pat. No. 5,362,545 for "Aligned Fiber Reinforcement Panel for Structural Wood Members."

TECHNICAL FIELD

This invention pertains to the reinforcement of structural wood members, including beams, columns, panels, and trusses. More particularly, the present invention pertains to synthetic reinforcement having a surface adapted for improved adhesion to a structural wood member to improve the tensile or compressive loading of the structural wood member and to processes for fabricating such synthetic reinforcement.

DESCRIPTION OF THE RELATED ART

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer lumber, parallel strand lumber, and I-beams. These manufactured wood structural members have replaced sawn lumber or timbers because the former have higher design limits resulting from better inspection and manufacturing controls. Wood is a highly desirable material for use in and as structural members because of its advantageous characteristics, including strength to weight, appearance, cyclic load response, and fire resistance.

Laminated beams can be used structurally to span open areas to support loads of many tons. When a laminated beam is loaded, the load can cause tensile forces in some laminae and can cause compressive forces in some laminae. Typically, when loading a laminated beam or beams with a uniform load between support points, the bottom laminae are primarily subjected to tensile stress, while the top laminae are primarily subjected to compressive stress.

Synthetic reinforcements for wood beams can be designed specifically to resist high tensile stress or to resist high compressive stress. The load-bearing capacity of laminated beams may be increased substantially by adding synthetic reinforcements to the areas of greatest stress, namely, close to the bottom laminae and close to the top laminae. The synthetic reinforcements used in the areas of high tensile and compressive stress would typically differ to provide superior reinforcing.

There is a need for synthetic reinforcements that can be effectively and economically adhered to a wood lamina and a method of forming such reinforcements. Until the present invention, plastic panels could be adhered to wood beams and to each other and other structural wood members only with expensive epoxy adhesives. In contrast, the wood laminae of wood structural members are typically bonded together with a low-cost adhesive such as resorcinol, phenol-resorcinol, cross-linked melamine, and polyvinyl acetate (PVA). Thus, a separate gluing step and a separate gluing application apparatus are typically necessary for gluing synthetic reinforcements to the wood laminae to make reinforced glue-laminated wood beams.

SUMMARY OF THE INVENTION

Accordingly, it is an object of the present invention to provide improved adhesion of synthetic reinforcements to structural wood members, including laminated wood members and including reinforced wood members.

Another object of the present invention is to provide synthetic reinforcements having a surface treatment that facilitates the use of commercial grade adhesives such as resorcinol to adhere the improved synthetic reinforcement to wood members and processes for fabricating the same.

A further object of the present invention is to provide an improved synthetic reinforcement including a resin encasement having a major surface with recesses that increase the surface area of the resin encasement and increase adhesion into the substrate thereby increasing the shear performance of the adhesive, and processes for fabricating the same.

The problems associated with known reinforcement panels are addressed in the present invention by providing reinforcements having a surface adapted for improved adhesion to one or more wood laminae and to themselves. The present invention provides a synthetic reinforcement that may include a plurality of continuous fibers in a resin encasement. The surface of the resin encasement includes recesses that are located in a random or other pattern and that increase the surface area of the resin encasement. The recesses also may allow areas of glue to accumulate and polymerize to increase glue line shear resistance. The increased surface area of the synthetic reinforcement of the present invention may be bonded to wood laminae or themselves with inexpensive commercial grade adhesives including resorcinol resins such as are commonly used for adhering wood laminae to each other.

The present invention also includes a fabrication process for making reinforced wood structural members having increased load-carrying capacity wherein a generally non-reactive and at least partly removable agent is added to a curable resin that is used to make the synthetic reinforcement. To make the synthetic reinforcement, a plurality of continuous fibers are wetted with a curable resin, including the partly removable agent, the resin cured, and a portion of the agent removed from the resin to provide synthetic reinforcement having recesses located in a random or other pattern at least in the opposed major surfaces of the panel. The surfaced reinforcement panel may be bonded to one or more wood members or other reinforcement panels or laminae such that the adhesive contacts at least a portion of a plurality of the recesses.

Additionally, the present invention includes optimization of the time between application and contacting of adhesive to the surface or surfaces that form the reinforcement/wood lamina interface referred as "open time." After application of adhesive to the surface of the reinforcement, the surface is allowed to air dry for an optimal time period before the reinforcement surface is brought into contact with the wood lamina to which it is typically clamped for curing. Optimization of open time according to the present invention increases the strength and integrity of the wood to reinforcement bond.

The foregoing and other objectives, features, and advantages of the invention will be more readily understood upon consideration of the following detailed descriptions, taken in conjunction with the accompanying drawings.

DETAILED DESCRIPTION OF PREFERRED EMBODIMENTS

Figure 1:
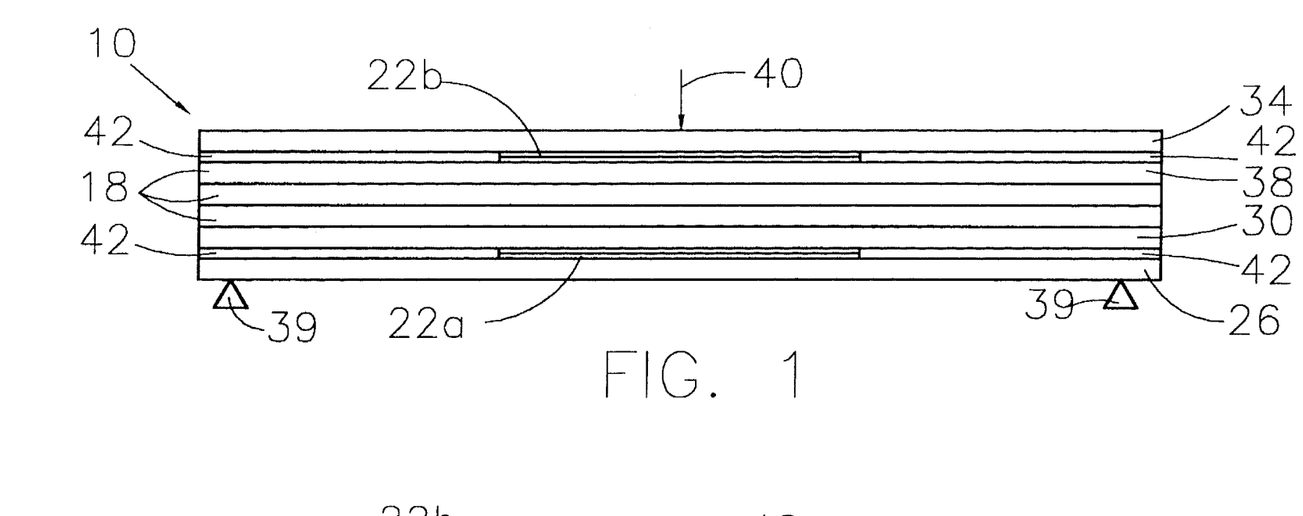
FIG. 1 is a side elevational view of a wood laminated beam showing the improved synthetic reinforcements of the present invention located between laminae.
Figure 2:
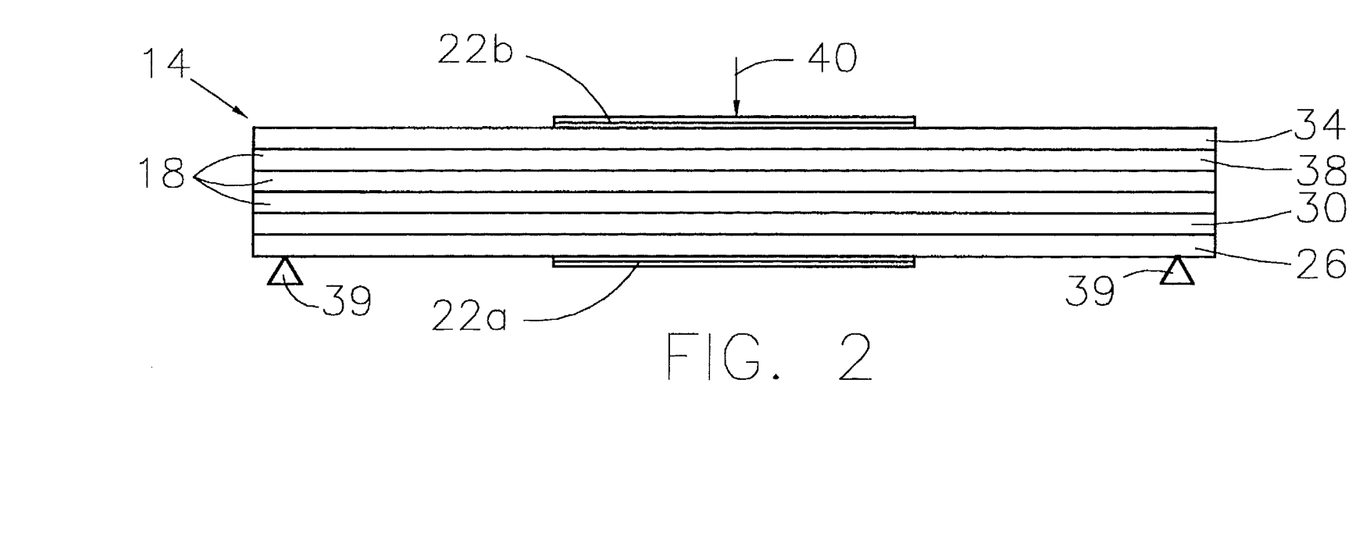
FIG. 2 is a side elevational view of a wood laminated beam showing the improved synthetic reinforcements of the present invention located on its exterior surfaces.

FIGS. 1 and 2 show glue laminated wood structural members 10 and 14 having multiple wood laminae 18 that are bonded together and are preferably elongate boards. In this configuration, wood beams 10 and 14 are configured as glue-laminated timbers according to manufacturing standards 117-93 of the American Institute of Timber Construction (AITC) of Englewood, Colo. Although this is a preferred configuration of wood beams 10 and 14, the following description is similarly applicable to other wood structural members, including laminated veneer lumber, parallel strand lumber and wood I-beams, and reinforced wood composites.

Referring to FIG. 1, a first synthetic reinforcement 22a is located between the bottom lamina 26 and adjacent lamina 30. A second synthetic reinforcement 22b is located between the top lamina 34 and its adjacent lamina 38. Each of reinforcements 22a and 22b, referred to collectively as reinforcements 22, extends about approximately three-fifths the length of beam 10. Reinforcements could extend for a greater length of beam 10 and could extend the full length of beam 10.

As exemplary simple beams, wood structural members 10 and 14 would be supported by a pair of supports 39 and bear a load 40. In such a configuration, synthetic reinforcements 22a and 22b are positioned in regions of, respectively, high tensile stress and high compressive stress. It will be appreciated, however, that reinforcements 22a and 22b could alternatively be in regions of high compressive and tensile stress, respectively, if structural members were cantilevered.

Spacers 42 extend from each end of each of reinforcements 22a and 22b to the end of wood beam 10 and are preferably made of wood. A reinforcing panel which covers two-fifths to three-fifths of the central portion of the beam provides substantially all the essential benefit of a full-length reinforcing panel but at a lower cost per beam. FIG. 2 illustrates just one alternative embodiment of the present invention wherein reinforcements 22a and 22b are located on the exterior of wood beam 14 and no spacers are provided.

Figure 3:
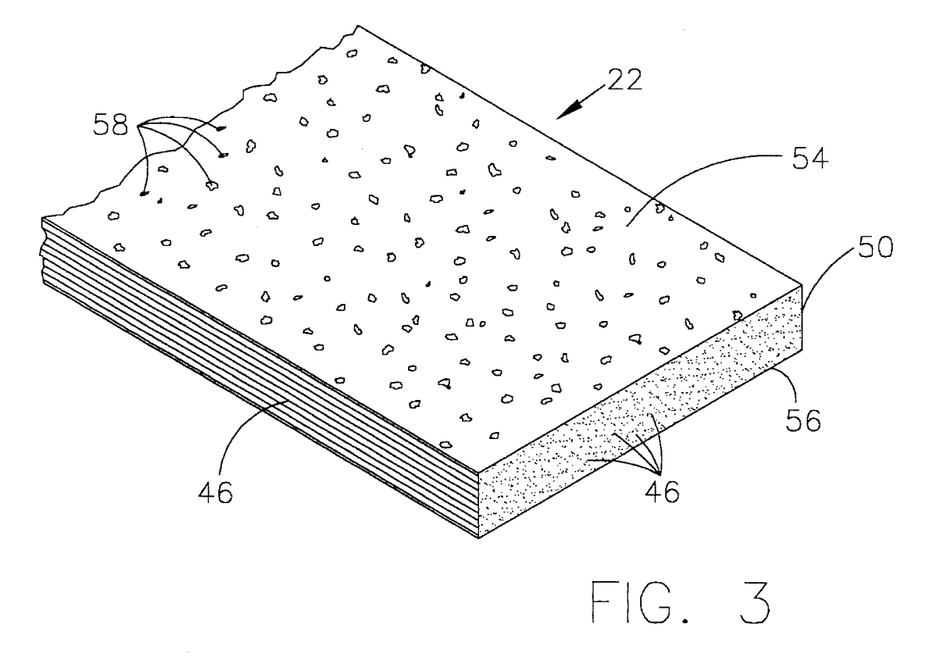
FIG. 3 is a perspective view of an improved reinforcement panel embodying the present invention.

FIG. 3 is an enlarged illustration of reinforcement 22 showing that it includes multiple synthetic fibers 46 that are arranged generally parallel to one another and are generally aligned with a longitudinal dimension of reinforcement 22, as described below in greater detail. Synthetic fibers 46 are maintained in their arrangement and alignment by a resin encasement 50 that surrounds the fibers and fills the interstices between the fibers. In one preferred embodiment, the resins are curable, inexpensive, commercial grade adhesives including, for example, resorcinol resins, phenol-resorcinol, cross-linked melamine, and polyvinyl acetate (PVA), which are suitable for adhering wood laminae 18 (and reinforced wood composites) to each other.

Reinforcing fibers 46 are preferably aramid fibers, fiberglass, or carbon fibers. Aramid fibers are available from E. I. dupont de Nemours & Co., Delaware, under the trademark Kevlar™ and from Akzo N.V.'s fiber subsidiary, Enka BV (Arnhem, the Netherlands) under the trademark Twaron™. A preferred grade of aramid fibers is Kevlar 49™. Fibers 46 may also comprise or include a high modulus polyethylene fiber such as high molecular weight Spectra™ sold by Allied Fibers of Allied Signal, Petersburg, Va. Another possible fiber is S-2 glass from Owens-Corning Fiberglass, Corning, New York. Aramid fibers and carbon fibers are the preferred materials in regions of high tensile and high compressive stress, respectively. Fiberglass fibers are a lower cost alternative to both.

Experimentation with nonepoxy resin encasements has resulted in interlaminar shear failure in reinforcement 22. Preferably, the curable resin used in fabrication of the reinforcement 22 is an epoxy resin. However, alternative embodiments could use other resins such as polyester, vinyl ester, and phenolic resins. Alternative embodiments of the present invention could use thermoplastic resins including poly(ethyleneterephthalate) (PET), PSP, or nylon-66.

In accordance with the present invention, multiple recesses 58 in resin encasement 50 are distributed over the opposed major surfaces 54 and 56 of reinforcement 22. Recesses 58 increase the surface area of reinforcement 22, facilitate adhesion of reinforcement 22 to adjacent wood laminae 18 and to itself in multiple laminations, and increase the strength of the adhesive bonding. In a first preferred embodiment, recesses 58 may be formed by applying to the curable resin during manufacture of resin encasement 50 an agent that is generally nonreactive with the curable resin, and then removing the generally nonreactive agent.

Figure 4A:
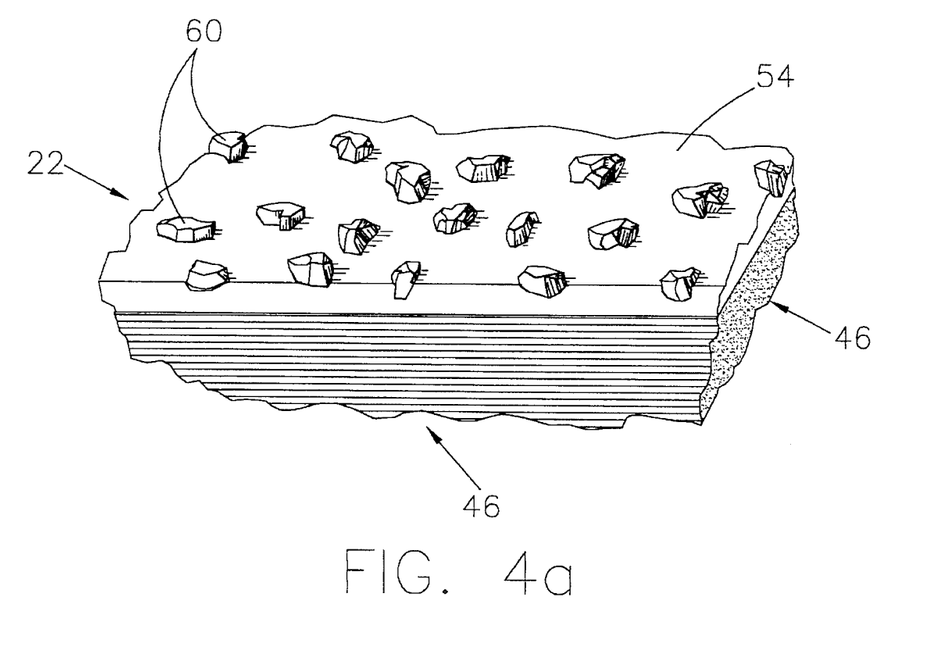
FIGS. 4A–4B are fragmentary sectional views of an improved reinforcement panel of the present invention showing in FIG. 4A solid particulates on the resin encasement and in FIG. 4B the resulting recesses after the solid particulates are removed.
Figure 4B:
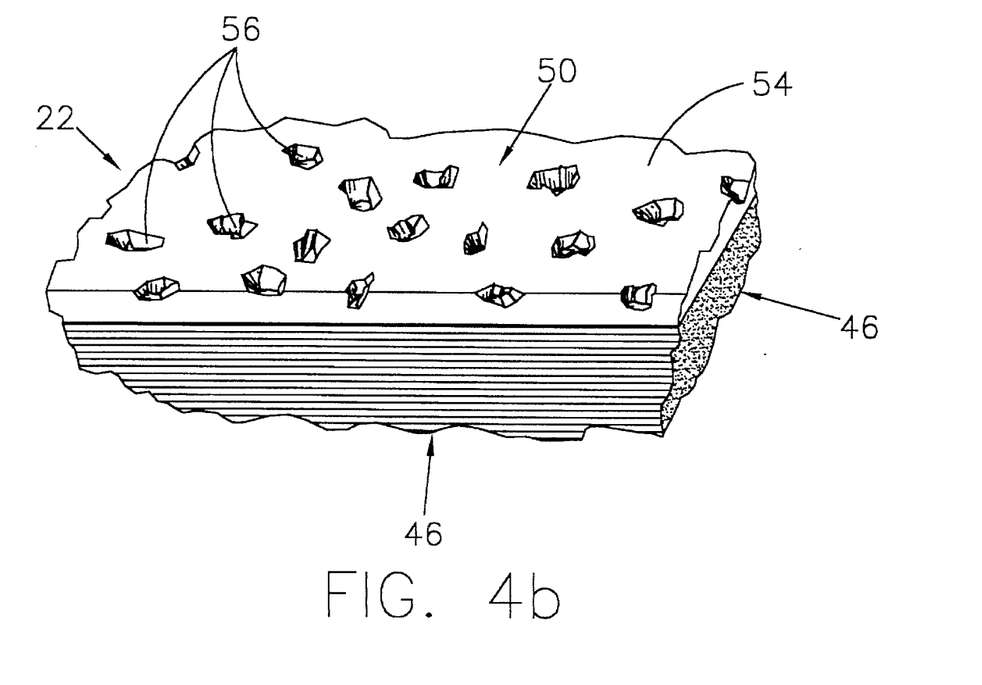

Referring to FIGS. 4A and 4B, the agent may be a solid particulate 60, such as chalkdust or clay, that is partly embedded in surfaces 54 and 56 (not shown) of resin encasement 50. The particulate, generally nonreactive agent could be removed, and recesses 58 formed, by light abrasion of major surfaces 54 and 56 after the curing of resin encasement 50.

Figure 5A:
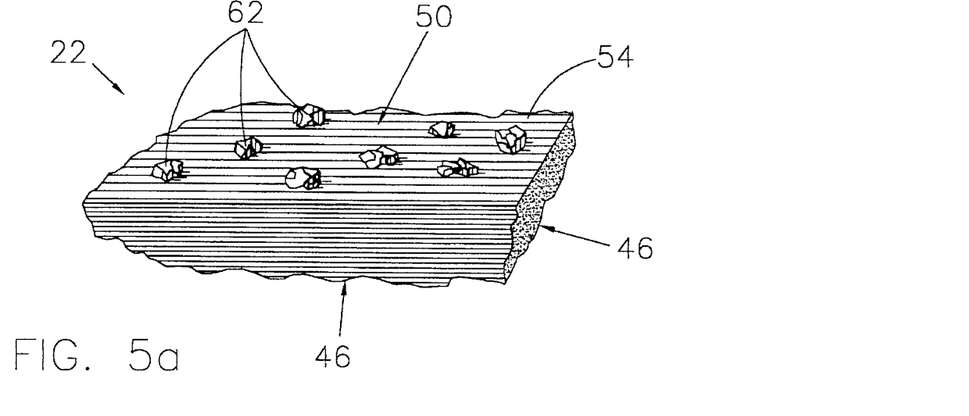
FIGS. 5A–5C are fragmentary sectional views of an alternative improved reinforcement panel of the present invention showing in FIG. 5A solid or liquid particulates on the reinforcing fibers, in FIG. 5B an overlying resin encasement, and in FIG. 5C the resulting recesses formed after the particulates are removed.
Figure 5B:
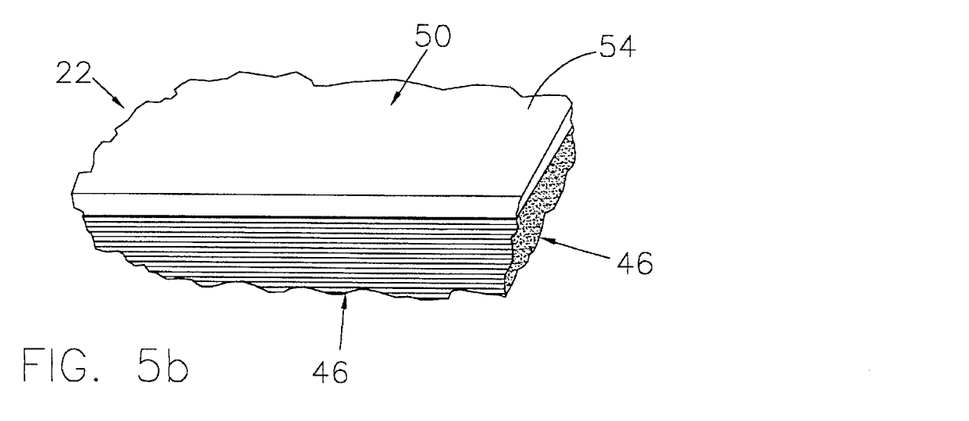
Figure 5C:
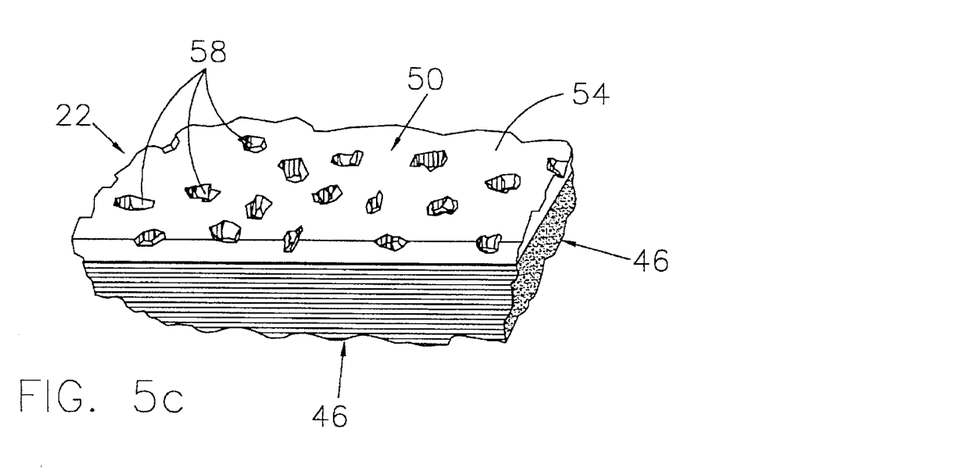

As another alternative, described with reference to FIGS. 5A–5C, the agent may be or may include a particulate solid or spritzed liquid material 62 that is applied to the matrix bath in its monomer form encasing the reinforcing fibers 46 prior to resin encasement 50 and generates, forms, or becomes a nonreactive gas upon heating or other processing. The formation of a nonreactive gas creates recesses 58. As a volatile liquid, for example, the agent 62 may be selected to have a boiling point lower than the temperature selected for curing resin encasement 50. As resin encasement 50 cures, liquid agent 62 forms a gas that escapes from resin encasement 50. As a result, recesses 58 are created in surfaces 54 and 56 as the curable resin cures. In one embodiment, reinforcement 22 and the liquid agent 62 may be methylethylketone or toluene and is preferably added to the curable resin at 2 to 15 weight percent agent/resin (wt %). In one particular preferred embodiment, the agent is toluene added to the curable resin at a concentration of approximately 5 wt %.

One preferred method of creating recesses 58 in surface 54 of resin encasement 50 is by abrading surface 54. One preferred method of abrading surface 54 is with a grit abrasive rubbed in a direction transverse or longitudinal to the longitudinal direction of reinforcement 22. Abrading the surface 54 of resin encasement 50 removes a small portion of the cured resin. This may expose the ends of a plurality of fibers 46, causing them to protrude from resin encasement 50. Abrading surface 54 of encasement resin 50 may remove particulate agent 60 or expose voids formed by liquid or solid agent 62, which upon exposure become recesses 58. Adhesive 66 may then enter recesses 58 and facilitate a strong and resilient bond of reinforcement 22 to lamina 18 of beam 10, 14, or to some other structural member.

Figure 6:
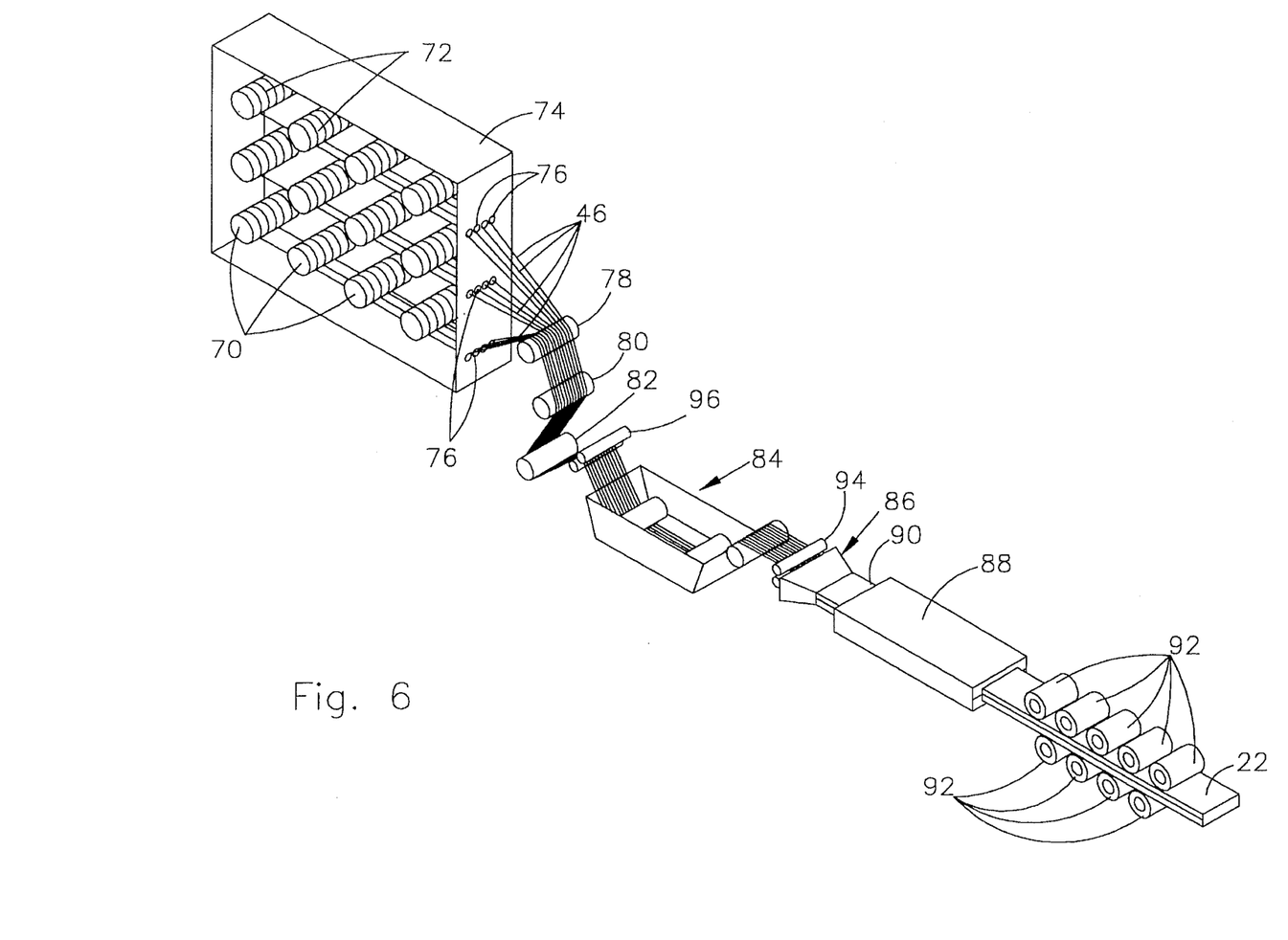
FIG. 6 is a perspective view of a pultrusion process that produces an elongated reinforcement panel of the present invention.

Referring to FIG. 6, reinforcement 22 of the present invention may be fabricated by the pultrusion process as described in U.S. patent application Ser. No. 08/037,580 of Tingley, filed Mar. 24, 1994, now U.S. Pat. No. 5,362,545, which is hereby incorporated by reference. Fibers 46 referred to herein may be synthetic fibers, and the fiber manufacturing process may first produce filaments which are grouped together into strands or fibers which are further grouped together into twisted strands, known as yarn, or untwisted strands, known as rovings, a preferred form of the fiber in the present invention.

Beginning with a plurality of bobbins 70 having synthetic fiber rovings 72 thereon, rovings 72 are pulled through a card 74 for alignment and to prevent entanglement of rovings 72. Card 74 has a plurality of openings 76 through which rovings 72 pass. The openings 76 are typically gasketed with a low friction material (not shown) such as a ceramic or plastic to prevent any abrasion or resistance to rovings 72 from the edges of openings 76. After rovings 72 pass through the card 74, the rovings are gathered and arranged parallel to one another by a first comb 78. After first comb 78, rovings 72 pass over a tensioning mandrel 80 and under a second comb 82, which further maintains the parallel arrangement of rovings 72. Thereafter, rovings 72 are wetted in resin bath 84, which includes the agent, and gathered by a forming die 86 prior to entering a heated die 88 having an orifice 90 that shapes the reinforcement 22. Rollers 92 provide a pulling force on the reinforcement 22. Tension is maintained on fibers 46 while heat from the die 88 cures the resin so that the reinforcement 22 emerges substantially rigid.

In accordance with the present invention, alternative opposed pairs of rollers 94 and 96 could be used to apply solid particulates 60 and 62 to fibers 46 and resin encasement 50, respectively. Solid particulates 60 and 62 could be fed to respective roller pairs 94 and 96 by, for example, hoppers or cascading rollers, as is known in the art. Liquid particulates 62 could be applied to fibers 46 by, for example, substituting opposed sprayers (not shown) for roller pair 96.

Experimentation has shown that the optimum tension in the fibers during the resin cure is approximately three to eight pounds. The fiber tension force is created by a back pressure on rovings 72, which may be accomplished by tensioning mandrel 80 in combination with combs 78, 82 or by the use of friction bobbins 70 wherein the rotational friction of the bobbins may be adjusted to provide the desired back pressure on the rovings.

Experimentation has also led to the important discovery that open times can be optimized. Open time is the time during which the adhesive used for the reinforcement/wood lamina interface is allowed to air dry and penetrate the surface prior to being brought into contact with other bond-forming surfaces. After application of adhesive to a surface of a plastic reinforcement panel to be used as a surface of the reinforcement/wood lamina interface, the adhesive bearing surface is typically given a short amount of open time. Five to 10 minutes has been typical in testing; for use in production, longer open times are typical. After the open time, the adhesive-bearing surface is brought into contact with the desired surface of wood lamina, which may also bear adhesive and have also been given an open time. According to a preferred embodiment of the present invention, open time for reinforcement is preferably greater than 10 minutes and less than 80 minutes, most preferably 30 minutes. An open time of greater than 80 minutes may be preferable for some applications, such as in manufacturing larger beams. After open time, and after the adhesive-bearing surface is brought into contact with the desired surface, the reinforcement and wood lamina are typically clamped together to ensure optimal bonding under pressure of over 125 psi to form a glue line thickness of less than 0.004 inches.

Typical clamp time has been eight to 10 hours with no post-clamp time prior to the application of stress to the reinforced structural member. It has been found that post-clamp cure time increases the strength of the bond and allows for more complete curing.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A synthetic reinforcement to be adhered to a wood structural member for increasing a load-carrying capacity of the wood structural member, said reinforcement comprising:

a plurality of continuous fibers, a substantial majority of which are continuous along the length of the synthetic reinforcement and are arranged substantially parallel to one another and are substantially aligned so as to be aligned with a longitudinal direction of the structural member when the synthetic reinforcement is adhered to said structural member; and a resin encasement for including substantially all of said continuous fibers therein, a surface of said resin encasement defining a plurality of recesses located in a generally random pattern and having protruding therefrom ends of a plurality of said fibers for the purpose of facilitating adhesion of the synthetic reinforcement to the wood structural member.

2. The synthetic reinforcement of claim 1 wherein said fibers are aramids, fiberglass, polyethylene, or carbon.

3. The synthetic reinforcement of claim 1 wherein said resin encasement defines a plurality of cells located in a random distribution therein.

4. The reinforcement of claim 1 wherein said resin encasement is a thermoset plastic selected from a group +consisting essentially of epoxy resin, polyester, vinyl ester, and phenolic resin.

5. The reinforcement of claim 1 wherein said resin encasement is a thermoplastic selected from a group consisting essentially of polyimides, PSP, PET, and nylon-66.

6. In a structural wood system, a first wood member adhesively connected to a second wood member and a synthetic reinforcement adhesively connected to the first wood member, the synthetic reinforcement comprising:

a plurality of substantially continuous fibers along the length of the synthetic reinforcement; and a resin encasement for encasing substantially all of the fibers and having a surface characterized by a plurality of recesses located in a generally random pattern for facilitating adhesion of the synthetic reinforcement to the first wood member.

7. The synthetic reinforcement of claim 6 wherein said fibers are aramids, fiberglass, polyethylene, or carbon.

8. The synthetic reinforcement of claim 6 wherein the resin encasement defines a plurality of cells located in a random distribution therein.

9. The synthetic reinforcement of claim 6, further including a plurality of fibers having an end that protrudes from said surface of said resin encasement for the purpose of facilitating adhesion of said panel to the structural member.

10. The reinforcement of claim 6 wherein said resin encasement is a thermoset plastic selected from a group consisting essentially of epoxy resin, polyester, vinyl ester, and phenolic resin.

11. The reinforcement of claim 6 wherein said resin encasement is a thermoplastic selected from a group consisting essentially of polyimides, PSP, PET, and nylon-66.

12. A process for making an engineered reinforced wood structural member having an increased load-carrying capacity compared to unreinforced wood members, said process comprising the steps of:

forming a synthetic reinforcement by:
dispersing a recess-forming agent into a curable resin, said agent being generally nonreactive with, and at least partly removable from, said resin;
wetting a plurality of continuous fibers with the resin;
curing said resin; and
inducing the departure of at least a portion of said recess-forming agent from said resin to provide a synthetic reinforcement having recesses located in a random pattern in the surface thereof; and adhesively connecting said synthetic reinforcement to at least one of two connected wood members, wherein said adhesive contacts at least a portion of a plurality of said recesses.

13. The process of claim 12 wherein the curing step further includes the evaporation of a portion of said recess-forming agent.

14. The process of claim 12 wherein the step of adhesively connecting the synthetic reinforcement includes the sub-steps of:

applying an adhesive to a first major surface of said synthetic reinforcement;

allowing the passage of an open time of greater than 10 minutes; and bringing into contact said first major surface and a surface of said wood laminae.

15. The process of claim 14 wherein the step of adhesively connecting the synthetic reinforcement includes the step of allowing the passage of an open time of about approximately 30 minutes.

16. The process of claim 12 wherein said fibers are aramids, fiberglass, polyethylene, or carbon.

17. The reinforcement of claim 12 wherein said resin is a thermoset plastic selected from a group consisting essentially of epoxy resin, polyester, vinyl ester, and phenolic resin.

18. The reinforcement of claim 12 wherein said resin is a thermoplastic material selected from a group consisting essentially of polyimides, PSP, PET, and nylon-66.

19. The process of claim 12 further comprising the step of abrading said synthetic reinforcement after said curing step so as to cause some portion of said fibers to protrude from said resin encasement.

20. An engineered structural wood member made by the process of claim 12.

* * * * *